(12) United States Patent
Stacey et al.

(10) Patent No.: US 6,765,921 B1
(45) Date of Patent: Jul. 20, 2004

(54) COMMUNICATIONS NETWORK

(75) Inventors: David Stacey, Stansted Abbotts (GB); Roy Mauger, Radlett (GB); Mark Gibson, Bishop's Stortford (GB)

(73) Assignee: Nortel Networks Limited, St. Laurent (CA)

( * ) Notice: Subject to any disclaimer, the term of this patent is extended or adjusted under 35 U.S.C. 154(b) by 643 days.

(21) Appl. No.: 09/605,236

(22) Filed: Jun. 28, 2000

(51) Int. Cl.[7] .............................................. H04L 12/28
(52) U.S. Cl. ...................... 370/401; 370/351; 370/392; 370/400
(58) Field of Search ................................. 370/351–356, 370/386, 388, 389, 392, 399, 395.21, 400, 401, 404, 409, 469, 397, 398, 395.31, 395.42, 395.43, 405, 406

(56) References Cited

U.S. PATENT DOCUMENTS

| | | | |
|---|---|---|---|
| 6,530,032 B1 * | 3/2003 | Shew et al. ................. | 370/218 |
| 6,574,195 B2 * | 6/2003 | Roberts ...................... | 370/235 |
| 2002/0097747 A1 * | 7/2002 | Kirkby et al. .............. | 370/468 |
| 2002/0181485 A1 * | 12/2002 | Cao et al. ................... | 370/419 |

FOREIGN PATENT DOCUMENTS

| | | |
|---|---|---|
| EP | 0892522 | 1/1999 |
| EP | 1 065 858 A2 * | 3/2001 |

OTHER PUBLICATIONS

Le Faucheur F: "IETF Multiprotocol Label Switching (MPLS) Architecture" Jun. 22, 1998 (XP–002115225).
Viswanathan et al: "Evolution of Multiprotocol Label Switching" IEEE Communications Magazine May 1, 1998 (XP–000752861).

* cited by examiner

Primary Examiner—Phirin Sam
(74) Attorney, Agent, or Firm—Barnes & Thornburg

(57) ABSTRACT

A communications multi-service network arrangement for transporting information packets from a user station to a destination comprises a label switched core network constituted by a plurality of abstract nodes interconnected by tunnels. Each abstract node comprises one or more real nodes. An access network provides user access to the core network. A route across the core network comprises a plurality of label switched path sections specified in terms of a sequence of abstract nodes, the route being identified by a label stack identifying a quality of service capable connection from the end station via the access network to the core network and across the core network to a destination.

26 Claims, 15 Drawing Sheets

EACH TUNNEL IS ASSUMED TO PERFORM PENULTIMATE HOP POPPING AT THE CORE LSR PRIOR TO THE VPN LSRs ILLUSTRATED ABOVE

COMMUNICATIONS NETWORK

FIELD OF THE INVENTION

This invention relates to arrangements and methods for the switching or routing of traffic in a communication network

BACKGROUND OF THE INVENTION

Traditionally, two types of legacy telecommunication networks have been developed. The first type of legacy network is connection oriented and is used for the transport of narrow band voice traffic, typically carried in TDM frames. Such networks comprise for example synchronous or plesiochronous networks. The second type of legacy network is connectionless in nature and is used for the transport of broad band packet or cell-based data traffic. Such packet traffic includes for example Internet protocol (IP) traffic There is currently a drive towards unified networks which provide end to end transport for both voice and data services, and to this end the use of asynchronous transport has been introduced. This of course introduces the problem of supporting different protocols over a common network.

Asynchronous Transfer Mode (ATM) is the technology specified by the ITU-T as a broadband network technology suitable for all applications. For Internet protocol traffic however, ATM has proven to be less than fully effective at supporting Layer 3 routed applications, such as routed virtual private networks. This has led the IRTF (Internet Research Task Force) to specify multi-protocol label switching (MPLS) as a technology which inherits the desirable characteristics of ATM but is better matched to the Internet protocol. In particular MPLS provides a frame merge function in which data frames received from multiple sources are captured and sent out with a common label. This is key to support of Internet protocol Layer 3 Routed services. Service providers would ideally prefer a single network technology to support all of the services that they provide as this would achieve the lowest possible operational cost.

A particular problem with the introduction of a multi-service network is that of accommodating the various transport protocols and, in particular, that of providing end to end quality of service guarantees for high priority traffic such as voice. In particular, there is a need to provide a network that can carry both data and voice traffic at a local, national and international level while utilising a common transport protocol. A further problem with such a network is that of real time management of the virtual public/private networks that are established within the network. At present, each VPN manager requires a detailed knowledge of the network topology. In a large network this is a very significant operational tasks.

SUMMARY OF THE INVENTION

An object of the invention is to minimise or to overcome the above disadvantages.

In our co-pending application serial number 09/605,237 the use of a two-layer MPLS network in order to simplify the management of Virtual Public/Private Networks (VPN) is described.

According to a first aspect of the invention, there is provided a method of routing an information packet over a label switched path from an end station to a destination via an access network and a core network, the method comprising attaching to the packet a label stack identifying a quality of service capable connection from the end station via the access network to the core network and across the core network to the destination.

According to another aspect of the invention, there is provided a communications network arrangement comprising a multi-service core network comprising a plurality of nodes interconnected via quality of service capable tunnels and incorporating a frame-mode MPLS architecture, and an MPLS access network, wherein end-to-end QoS services are provided by defining a label stack which delivers packets through a sequence of tunnels in the core network defined by the stack.

Advantageously, the core network comprises a mesh of abstract nodes interconnected by tunnels and each comprising one or more real nodes.

In a further embodiment, the invention provides a method of routing an information packet over a label switched path between first and second end stations in a virtual private network defined over a network arrangement incorporating an MPLS layer and comprising a hierarchical arrangement of first, second and third levels of routers, the method comprising attaching to the information packet a four-label stack at the edge of the network in order to achieve end-to-end connection oriented behaviour with guaranteed Quality of Service, and wherein the label allocation of a said information packet is determined from the MPLS layer.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Preferred embodiments of the invention will now be described with reference to the accompanying drawings in which.

DESCRIPTION OF PREFERRED EMBODIMENTS

Figure 1:
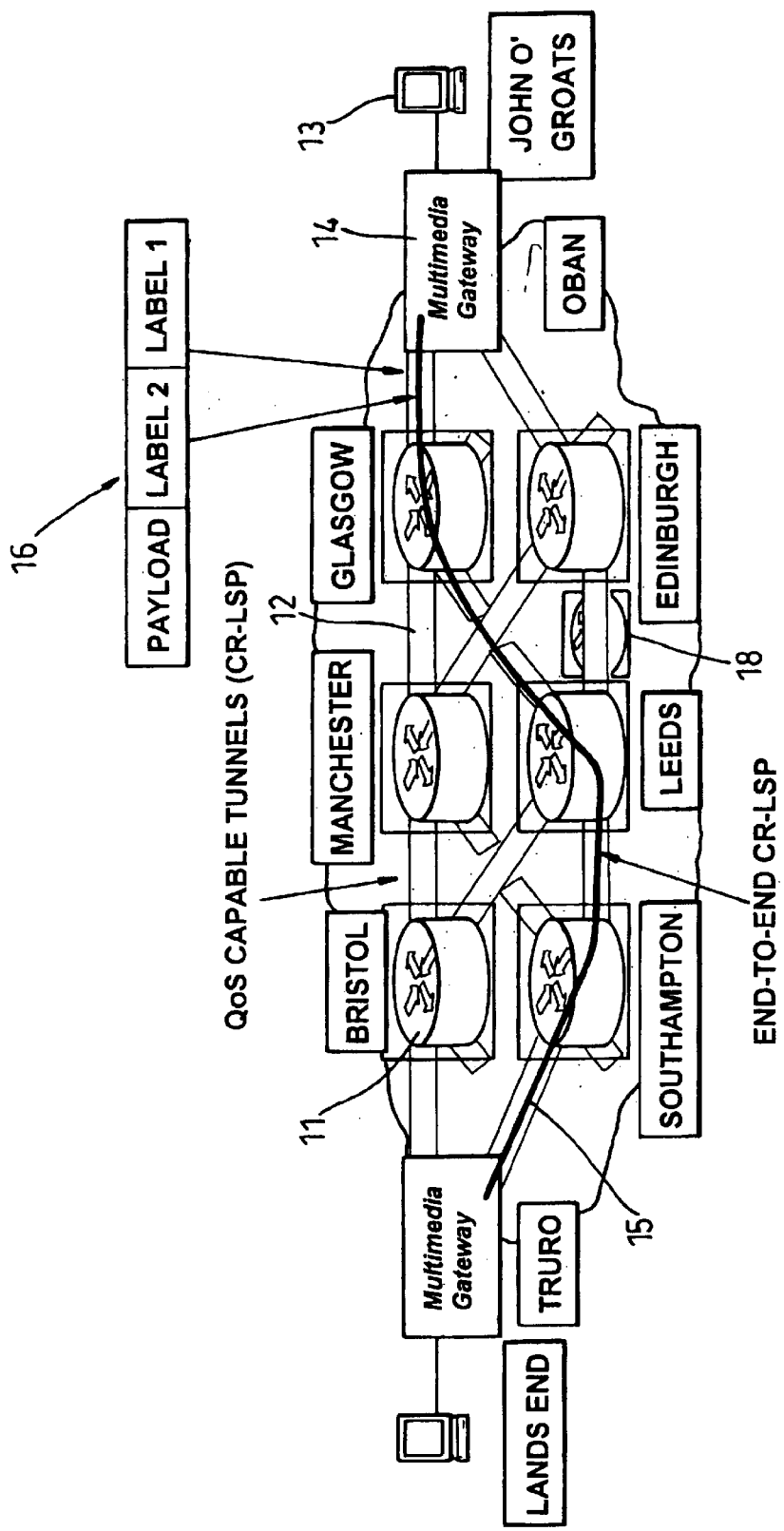
FIG. 1 is a schematic diagram of an exemplary virtual public/private network.

Referring first to FIG. 1, which is introduced for explanatory and comparative purposes, this figure illustrates in highly schematic form an exemplary virtual public/private network (VPN) deployed nationally or regionally in order to provide session switched multimedia services on a territorial basis. The network comprises a number of service nodes 11, located at the main centres of population, inter-linked via a network of core nodes by quality-of-service (QoS) capable tunnels 12. The construction of the core network will be described below. In FIG. 1, only one core node 18 is shown in the interests of clarity, but it will of course be appreciated that the network will incorporate a plurality of core nodes. Access to the network from user terminals 13 is provided via media gateways 14 each serving to one or more service nodes. Traffic is transported on constraint-based muted label switched paths (CR-LSP) 15 established between respective gateways. The network carries packet traffic, each packet 16 comprising a payload and first and second labels (Label1, Label2) indicative of the path over which the packet is to be routed.

CR-LSPs (constraint-based routed label switched paths) are deployed between the service nodes 11 of the network. Services such as inter-active voice, requiring strict QoS guarantees are supported by end-to-end CR-LSPs 15 as illustrated in FIG. 1. To take a simple example of QoS support, if all of the CR-LSPs at both traffic-trunk level and end-to-end are constant bit rate, then the performance of the end-to-end CR-LSP can be substantially equivalent to ATM-AAL1 (Asynchronous Transfer Mode Adaptation Layer One) assuming a typical 48-byte packetisatlon.

The IETF has defined two protocols for the establishment of CR-LSPs. These protocols are RSVP-Traffic Engineering, and Constraint-routed Label Distribution Protocol. CR-LSPs (constraint-based routed label switched paths) are point-to-point paths between designated network nodes. Such paths are each assigned a traffic contract which, in suitable carrier strength implementations, will be policed for conformance. The following description of the best method of performing the invention is based on the CR-LDP protocol, but it will be appreciated by those skilled in the art that the RSVP-TE protocol has equivalent functionality and can be used to serve the same purpose. Such a CR-LSP (constraint-based routed label switched path) has an LSPID (label switched path identifier) which can be used to specify a hop in a CR-LDP request. In such a case the new CR-LSP will be multiplexed into the specified CR-LSP and allocated a second level label. It is therefore possible to specify within the network of FIG. 1 a virtual public/private network (VPN) with multiple stages of first level CR-LSPs and to provide end-to-end services having a CR-LSP traffic contract.

A feature of the constraint based routed label distribution protocol (CR-LDP) employed in the network of FIG. 1 is the use of an "abstract node" to define routing constraints. An abstract node consists of a sub-network of real nodes (core nodes) over which the constraint based routed label distribution protocol is allowed to select any available path to achieve a requested connection. Thus in a path specified as (real node A—abstract node B—abstract node C—real-node D) there may be multiple real nodes in each of the abstract nodes, and there may also be multiple trunks between the abstract nodes. This concept of abstract nodes simplifies the management of a VPN as the network manager only requires a view of the network at the abstract node level and does not require detailed view of the construction or internal operation of an abstract node.

Figure 2:
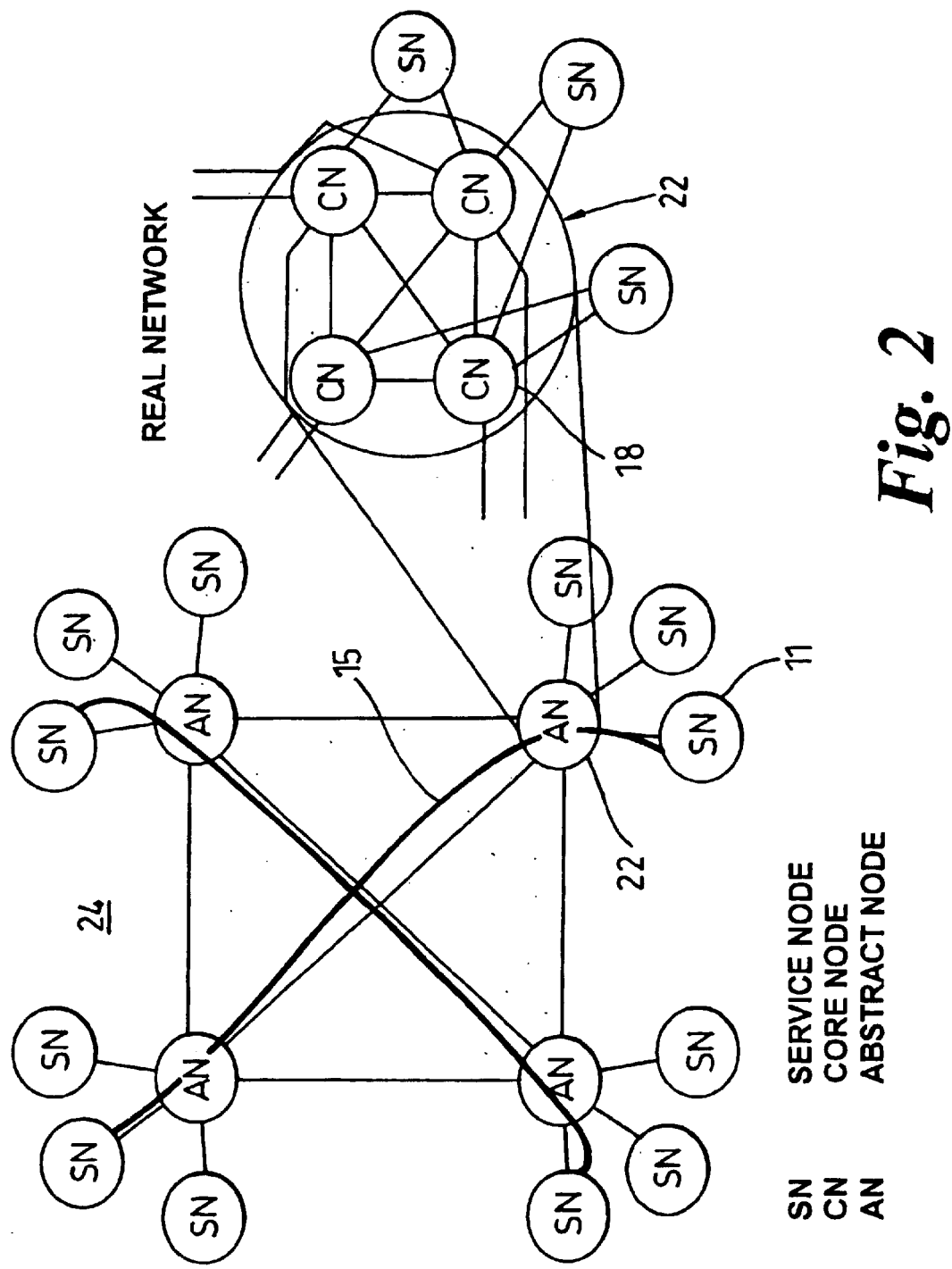
FIG. 2 shows the construction of an abstract node employed in the network of FIG. 1 and illustrates the network construction in further detail.

Referring now to FIG. 2, which is also introduced for explanatory and comparative purposes, this depicts in schematic form a portion of the network of FIG. 1. FIG. 2 is a representation of a simple network in its abstract node form, together with a possible real network realisation of one of the abstract nodes.

The network represents groups of multiple service nodes (SN) 11 each arranged around a respective abstract node (AN) 22 in each of four locations. One of the abstract nodes 22 is shown in detail to illustrate its construction from a sub-network of four core nodes (CN) 18 with multiple transport links 23 therebetween. In the network of FIGS. 1 and 2, an abstract node is defined by an IP address prefix, and all core nodes which include that prefix in their IP address are treated as part of that abstract node. It will of course be understood that an abstract node may be constructed from some other number of core nodes. Further, abstract nodes can have a temporary, semi-permanent or permanent existence depending on the network requirements.

Constraint based routed label switched paths 15 are deployed between service nodes 11 via the appropriate intervening abstract nodes 22.

In the arrangement of FIGS. 1 and 2, it is relatively simple for a management system controlling the real network to produce an abstract node version of its information model for use on a super-ordinate network manager. It is also relatively easy to produce a graphical representation of such a network and to specify traffic trunks by defining paths between service nodes and passing through abstract nodes. These graphical paths can then be used to automatically construct CR-LIP requests to establish the traffic trunks. CR-LDP can run on an existing constraint-based routed label switched path (CR-LSP) to renegotiate the traffic contract so that the technique provides for near real-time creation of VPNs as well as flexible service level agreements which can be modified e.g. on a diurnal basis or on any basis which suits the customer traffic profile.

Figure 3:
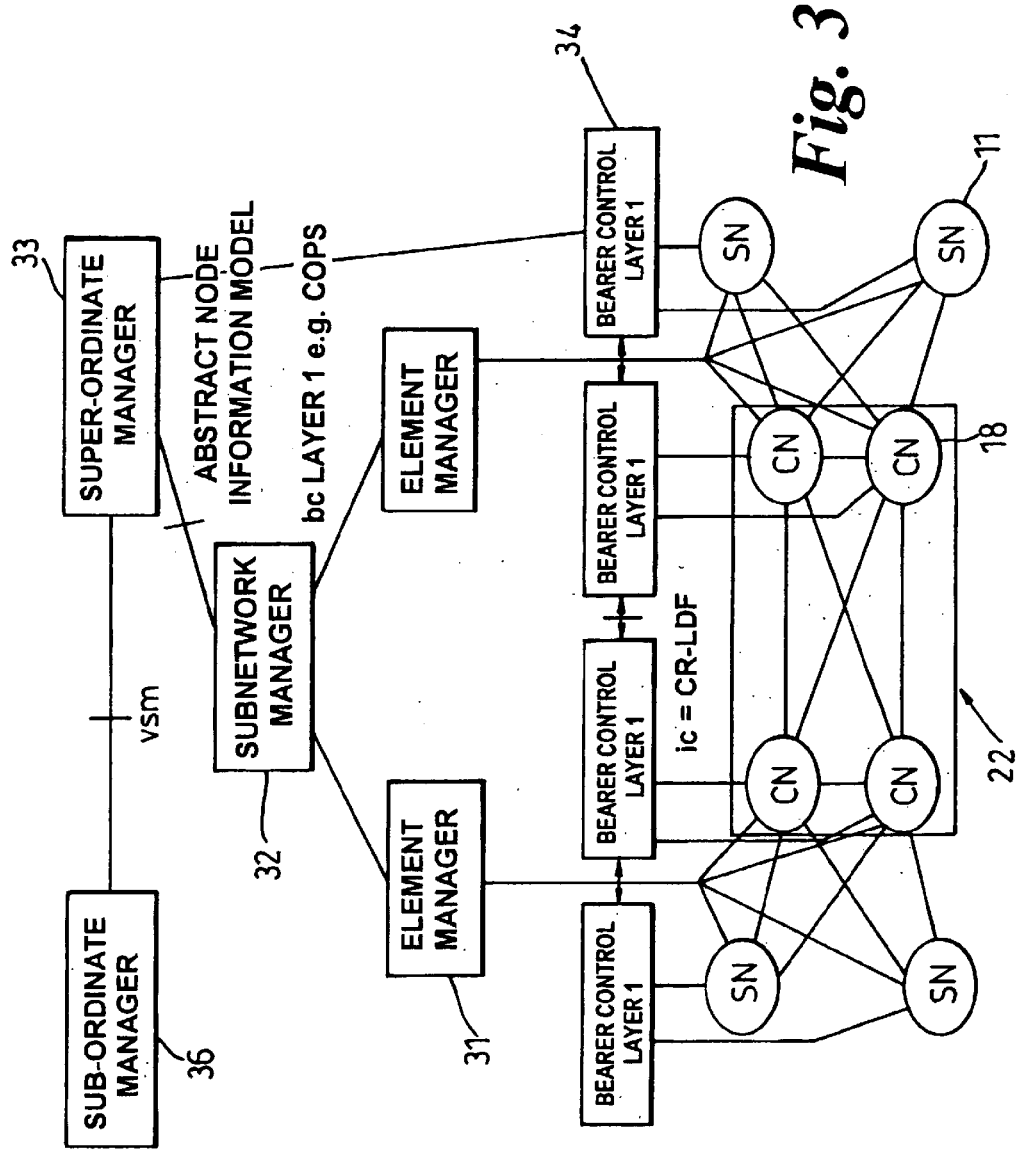
FIG. 3 shows an exemplary Layer 1 management and bearer control architecture.

A management and bearer control function for the Layer 1 physical network of FIGS. 1 and 2 is illustrated in FIG. 3. This figure shows by way of example a simple network based on a group of core nodes 18, constituting an abstract node 22, and service nodes 11. The real network has a management system based on a hierarchical structure of element managers 31 and (sub) network managers 32. The (sub) network manager 32 is responsible for constructing the abstract node information model representation of the network, which information is passed to a super-ordinate manager 33. A sub-ordinate manager 36 provides virtual switch management to perform fault, configuration, accounting, performance, and security management. The super-ordinate manager 33 is used for defining VPNs and placing traffic trunks to realise those VPNs. The super-ordinate manager also creates, modifies and deletes virtual switches. Traffic trunk requests are passed to bearer control Layer 1 (34) to initiate the CR-LDP process. This is the interface point for MPLS Layer 1 Bearer Control for which the common open policy service protocol (COPS) is preferred.

Figure 4:
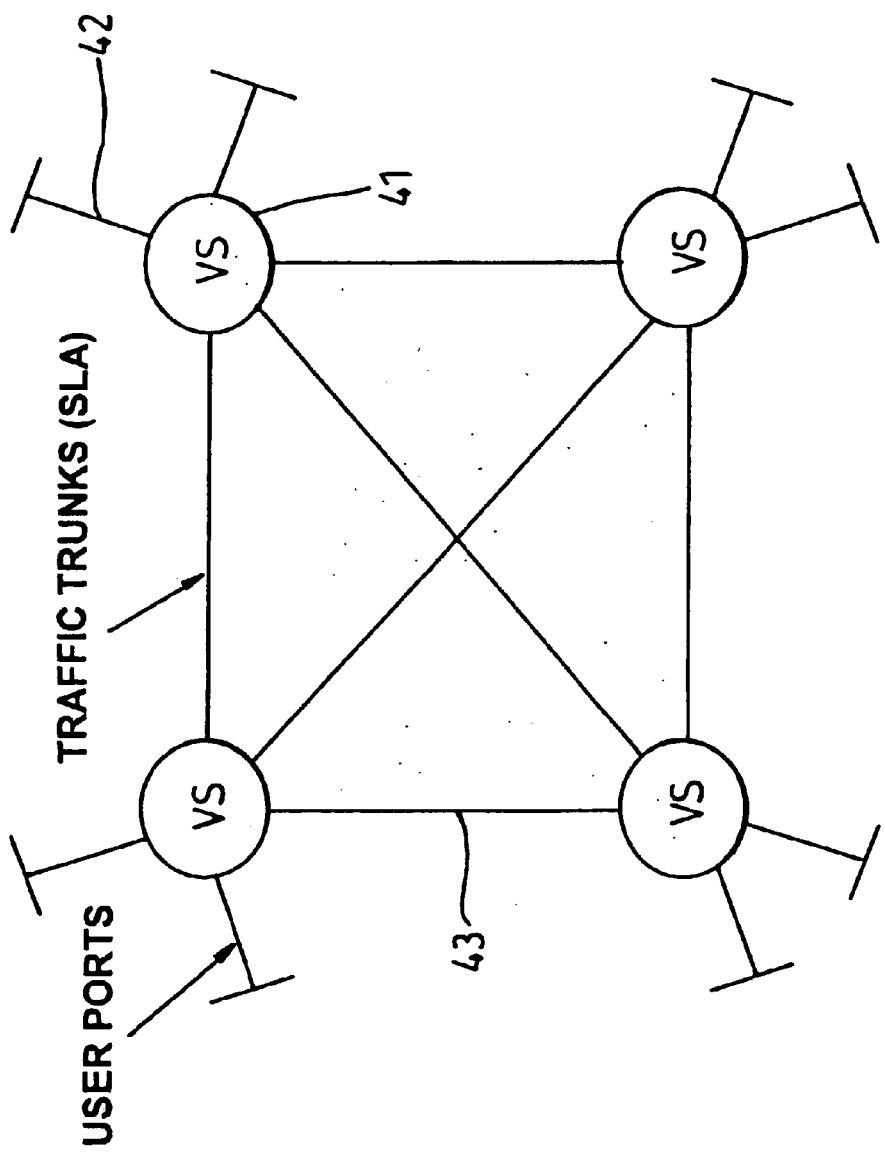
FIG. 4 illustrates a virtual public/private network information model.

The information model illustrated in FIG. 4 for the sub-network manager 32 is also simplified in that only the Layer 2 virtual switches (VS) 41 are visible. These virtual switches are configured with access ports 42 to which users are connected and traffic trunks 43 configured end-to-end and provisioned with SLAs.

Figure 5:
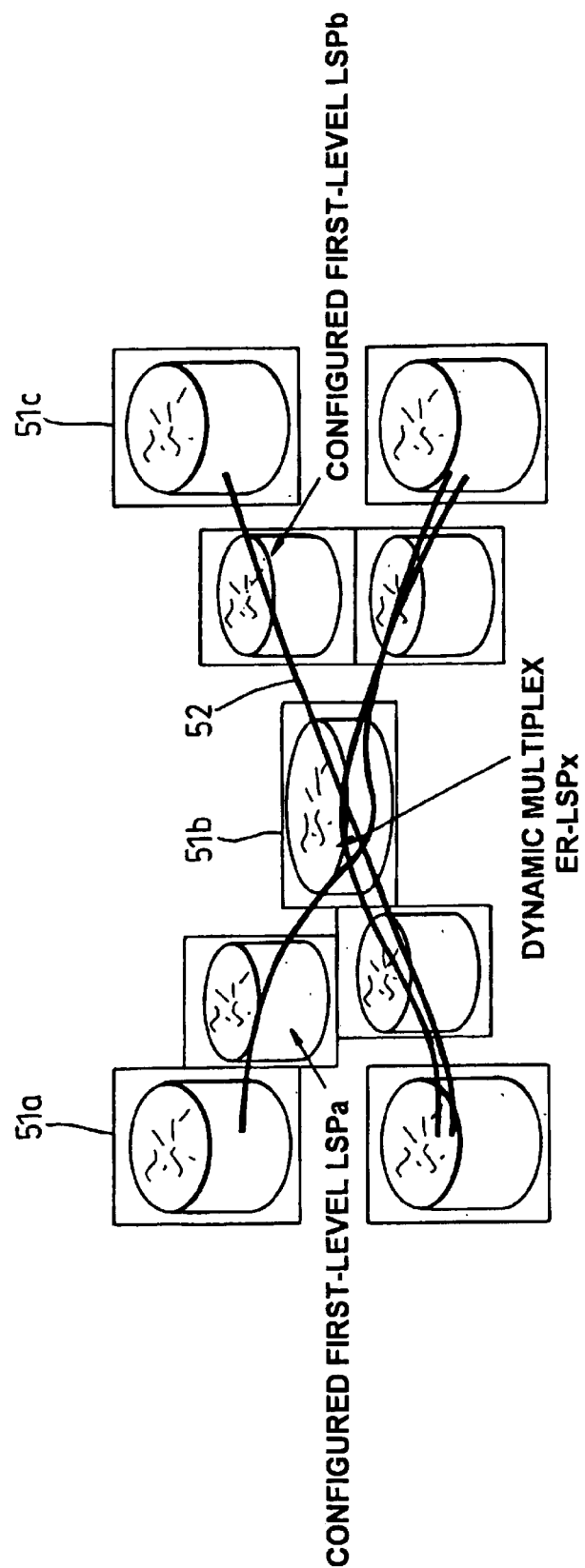
FIG. 5 illustrates the concept of a Dynamic Multiplex Label Switched Path.

Referring now to FIG. 5, the concept of a Dynamic Multiplex LSP according to a preferred embodiment of the invention is illustrated. In the exemplary network of FIG. 5, a hierarchical three layer arrangement of local nodes 51a, regional nodes 51b and international nodes 51c is provided, each node comprising a label switched router. Within the three-stage network of MPLS label switched routers (LSR) 51a, 51b, 51c, a mesh of Layer 1 label switched paths (LSPs) 52 is established. As described above it is possible to define the constraints for a new LSP in terms of existing LSPs in which case a Layer 2 label switched path (LSP) 55 is established and a second level label defines the embedded CR-LSP. In the DM-LSP arrangement illustrated in FIG. 5, a third level label is defined which relates to one of a number of sessions which can be dynamically multiplexed onto the same LSP. In our arrangement depicted schematically in FIG. 5, a new session may be multiplexed onto the DM-LSP if and only if the resource constraints of the ingress and egress Layer 1 CR-LSPs are satisfied. The checking of these constraints can be performed in the first and third stage LSRs (label switched routers) 51a, 51c, which have full visibility of the resources committed to the ingress and egress Layer 1 LSPs respectively. The Layer 2 LSRs 51b perform an implicit switching function in that sessions may be dynamically routed between first and third stage LSRs 51a, 51c, using any available Layer1 CR-LSP, but the second stage LSRs 51b are not involved in the control process. FIG. 5 also illustrates a number of LSRs which are used to route the Layer 1 CR-LSPS. These are additional network stages that may be required for the traffic management of large numbers of VPNs, but they need not be directly involved in the operation of the DM-LSPS.

Figure 6:
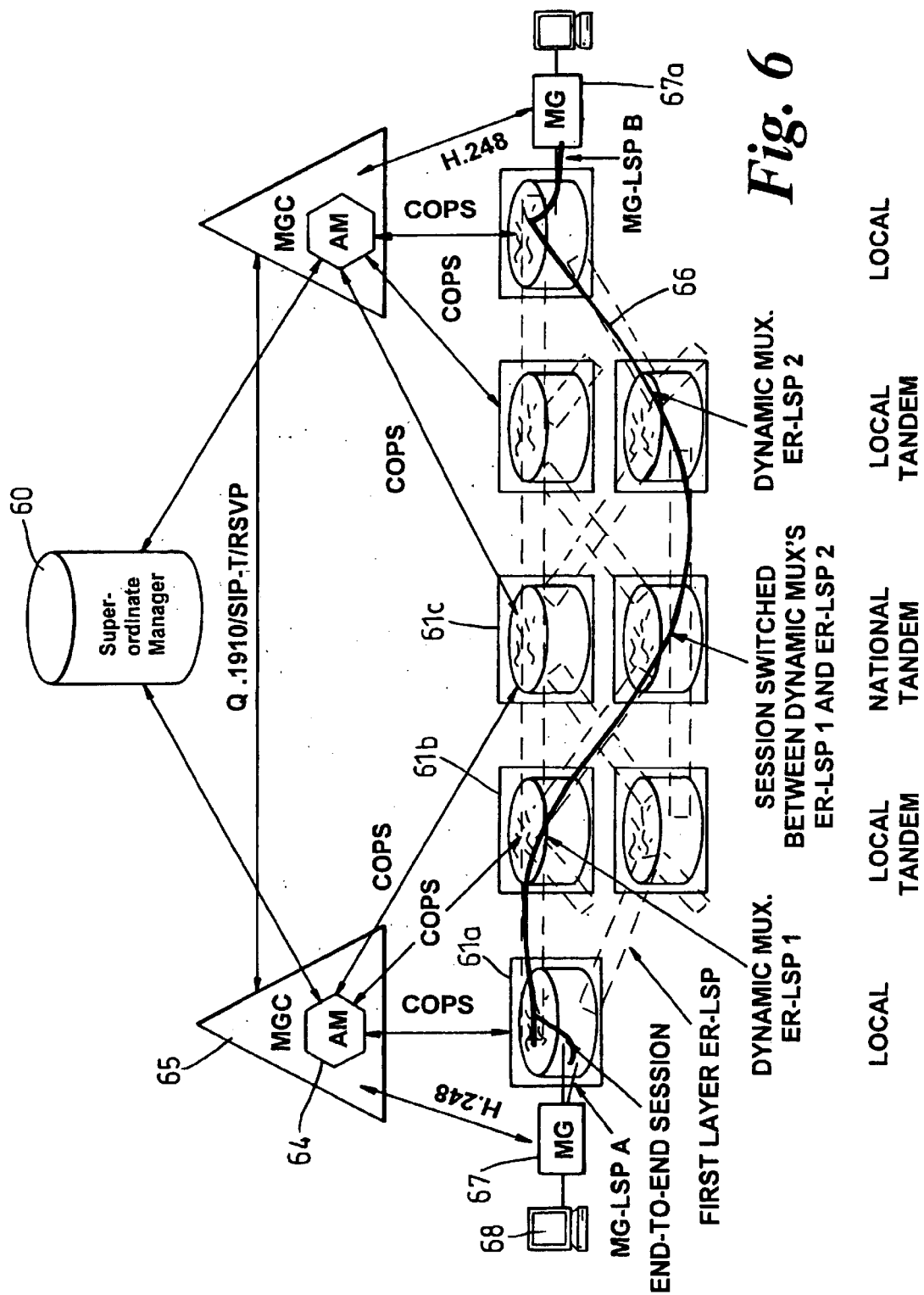
FIG. 6 illustrates a virtual public/private network according to a preferred embodiment of the invention controlled by a four-label stack.

An exemplary five-stage virtual private network (VPN) with four-layer label control is illustrated in FIG. 6. The network comprises a hierarchical or layered structure of local routers 61a, local tandem routers 61b and national tandem routers 61c. A super-ordinate manager 60 is responsible for configuring one or more virtual private/public networks within the network structure of FIG. 6. This VPN configuration is performed by defining the Layer 1 LSPs (label switched paths) in terms of service level agreements and constraints for their routing through the network. This information is formulated as a COPS (Common Open Policy Service) command which is pushed down to the label switch router (LSR) 61a which forms the ingress of the requested CR-LSP. The super-ordinate manager 60 also pushes the COPS commands to an admission manager (AM) 64 within media gateway controller 65, which admission manager records resources available for use in service requests. The admission manager 64 then pushes the COPS messages down to the label switched routers (LSRs) 61a, 61b, 61c, where they are used to invoke RSVP-TE or CR-LDP sessions in order to establish the virtual private/public network (VPN). The super-ordinate manager 60 then establishes a mesh of DM-LSPs (dynamic multiplex label switched paths) 66 between all of the local label switch routers 61b and all of the national tandem label switch routers 61c. This mesh then establishes a network in which a constraint-based routed label switched path (CR-LSP) between any two local label switch routers can be specified by a pair of DM-LSPs (dynamic multiplex label switched paths). For a full mesh configuration, there are as many alternative routes between each pair of local label switch routers as there are national tandem label switch routers deployed in the network After the super-ordinate manager 60 has configured the core network, the admission manager 64 configures a set of label switched paths between the media gateway 67 coupled to user terminal 68 and the local LSR node 61a. When a media gateway controller 65 wishes to establish a session with QoS guarantees it sends a request to its associated admission manager 64. A session request may be initiated directly by a session control protocol such as Q1901 or SIP, or it may be initiated as a result of intercepting an RSVP message. Communication between the media gateway controllers advantageously uses a protocol which is able to tunnel connection control information such as Q1901, SIP or RSVP. The connection control information which is tunnelled between media gateway controllers is a list of label switched path identifiers (LSP-Ids). In the forward direction this information comprises a list of candidate dynamic multiplex label switched paths (DM-LSPs) which are suitable to access a national tandem together with an LSP-ID (label switched path identifier) for the media gateway (MG) to local LSR connection. In the reverse direction the control information comprises a list of the four LSP-IDs selected to form the end-to-end connection. I.e. MG-Local LSR, Local LSR-National Tandem LSR, National Tandem LSR-Local LSR, Local LSR-MG. The scheme may be operated separately for each direction of transport or bi-directional operation could be chosen. The five-stage network of FIG. 6 accommodates long distance or global traffic; fewer stages would be required for local services. On receipt of the list of the four LSP-IDs defining an end-to-end connection, the admission manager 64 uses COPS to push the list down to the local node 51a for routing to the far-end media gateway 67a. The Local LSR's response is to push four labels on to all packets received from the label switched path (LSP) identified as the connection from the local media gateway and then to forward the labelled packets. The media gateway may use labels internally, in which case the payload from the perspective of the Local LSR 61a will contain labels of significance only to the two media gateways involved. The first two labels are the two associated with the DM-LSP to the national tandem router 61b which labels were allocated when the virtual private network was configured and are stored in the local LSR 51a as related to its LSP-ID. The next two labels receive special treatment. An LSP-ID is intended for use as a network wide significant identifier for use in management systems as well as in LSRs. This LSP-ID comprises the IP address of the ingress node of the CR-LSP as well as a 16 bit locally significant identifier within that node. This locally significant identifier is sufficient to identify the DM-LSP from the National Tandem LSR 61b to the destination Local LSR 61a and from the Local LSR to the media gateway. These LSP-ID local identifiers are therefore used as the third and fourth labels and are treated as indirect addresses at the national tandem and local LSRs respectively.

The process of COPS push allows the policy being applied to a particular controlled flow on an MPLS router to be asynchronously updated. That is, the MPLS router is told how to change the treatment it applies to the flow, without first asking to change it. This process is underpinned by the use of ClientHandles to identify the flow. When the path for a new flow is received at an AM, a COPS Decision (DEC) message is pushed, that uses the ClientHandle associated with the outermost LSP. This naturally performs the selection of the first layer ER-LSP.

Contained with in this DEC (COPS Decision) is the list of paths over which the flow is to be routed. This list will include the LSP-ID of the near-end dynamic multiplex, the LSP-ID of the far-end dynamic multiplex and the LSP-ID of the connection from the far-end local switch to the destination MG.

Figure 7:
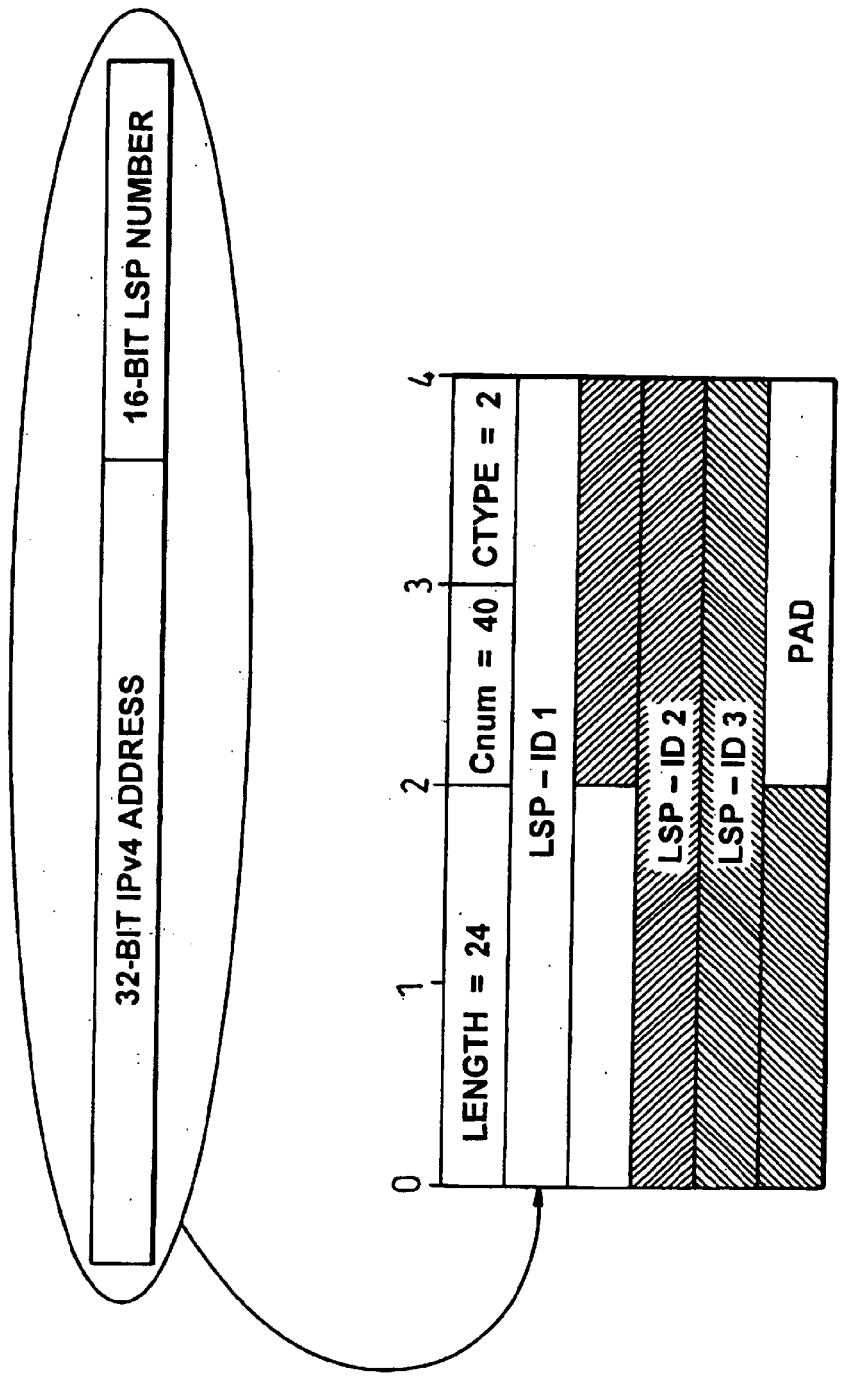
FIG. 7 illustrates a means of encoding MPLS LSP-ID information within a COPS message.

To permit the transfer of this information, we have defined a new COPS Specific Object. This is shown in FIG. 7. The object uses the existing COPS Specific Object pattern and has a CNum of 40 and CType of 21. The CNum is the identifier for the object, and the CType defines the instance of the object. The Object contains the list of LSP-IDs for the flow in the order in which they are to be used. Therefore LSP-ID 1 indicates the near-end dynamic multiplex and will be translated at the Local LSR into a two-tier label stack. Note that although the Clienthandle identifies the layer 1 trunk, this trunk and the dynamic multiplex share the same LSP-ID space at the local router and therefore LSP-ID 1 can easily identify the correct label stack. LSP-ID 2 will contain the LSP-ID of the second dynamic multiplex and LSP-ID 3 will contain the LSP-ID of the last hop from the far-end Local LSR to the media gateway.

These next two values are the full 48-bit LSP-IDs. In order that these two values should be copied in the same order into each packet in this flow as defined above, they must undergo suitable translation. As is Illustrated in FIG. 7, each LSP-ID consists of a 32-bit IP address and a 16-bit LSP number. It is the 16 bit LSP number that is of interest so each LSP-ID must have the IP address removed and replaced with 4 leading zeros. This makes use of the fact that inserting leading zeros on a binary number leaves the value of that number the same i.e. 1101=0000 1101.

With this translation performed, the LSP-IDs should be inserted in the same order as they occur in the COPS message, into the header of each packet in this flow at the Local LSR. That is, LSP-ID 3 should be the innermost of the labels.

Once this is successfully completed a Report State (RPT) message should be sent back, indicating that the new session was successfully installed.

By analogy with the PSTN five stages of switching appear to be desirable for QoS capable networks leading to Local/Local-Tandem/National-Tandem/Local-Tandem/Local routing for national services and Local/Local-Tandem/International-Tandem/Local-Tandem/Local routing for international services.

Figure 8:
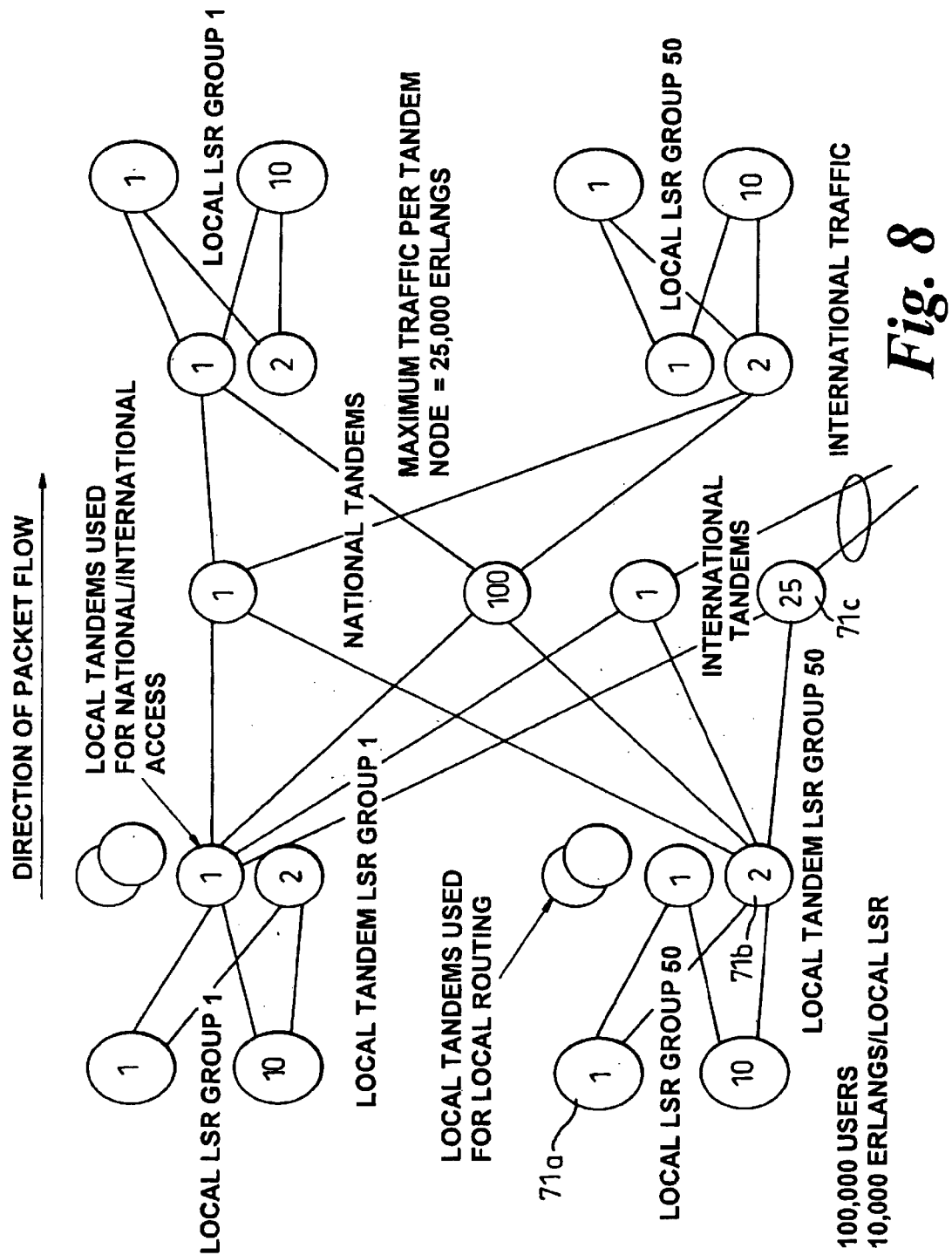
FIG. 8 illustrates an embodiment of FIG. 6 demonstrating its scalability to an extremely large network.

By way of example of the efficacy of the techniques described above, consider a carrier having 50 million customers in the USA and a further 50 million customers in the rest of the world with 0.1 Erlang of session traffic per customer. Assume that typically 40% of traffic is long distance and 10% of traffic is International. The United States network could be organised with e.g. five hundred local nodes with typically 100,000 customers each. The Local-Tandems could be disposed in e.g. fifty groups with two switches in each group dedicated to National and International traffic. Approximately one hundred national-tandems and twenty five international-tandems would be deployed throughout the world to provide a global network. In this scheme the local nodes would typically support only 10,000 Erlangs and no tandem node would need to support more than 25,000 Erlang of session traffic. These are trivial amounts of traffic by modem standards and this readily demonstrates the flexibility and efficacy of the five-stage network described herein. The connectivity of such a network is illustrated in FIG. 8. The nodes as illustrated are Virtual Nodes, and it will be appreciated that a real physical switch could support a number of such Virtual Nodes.

Figure 9:
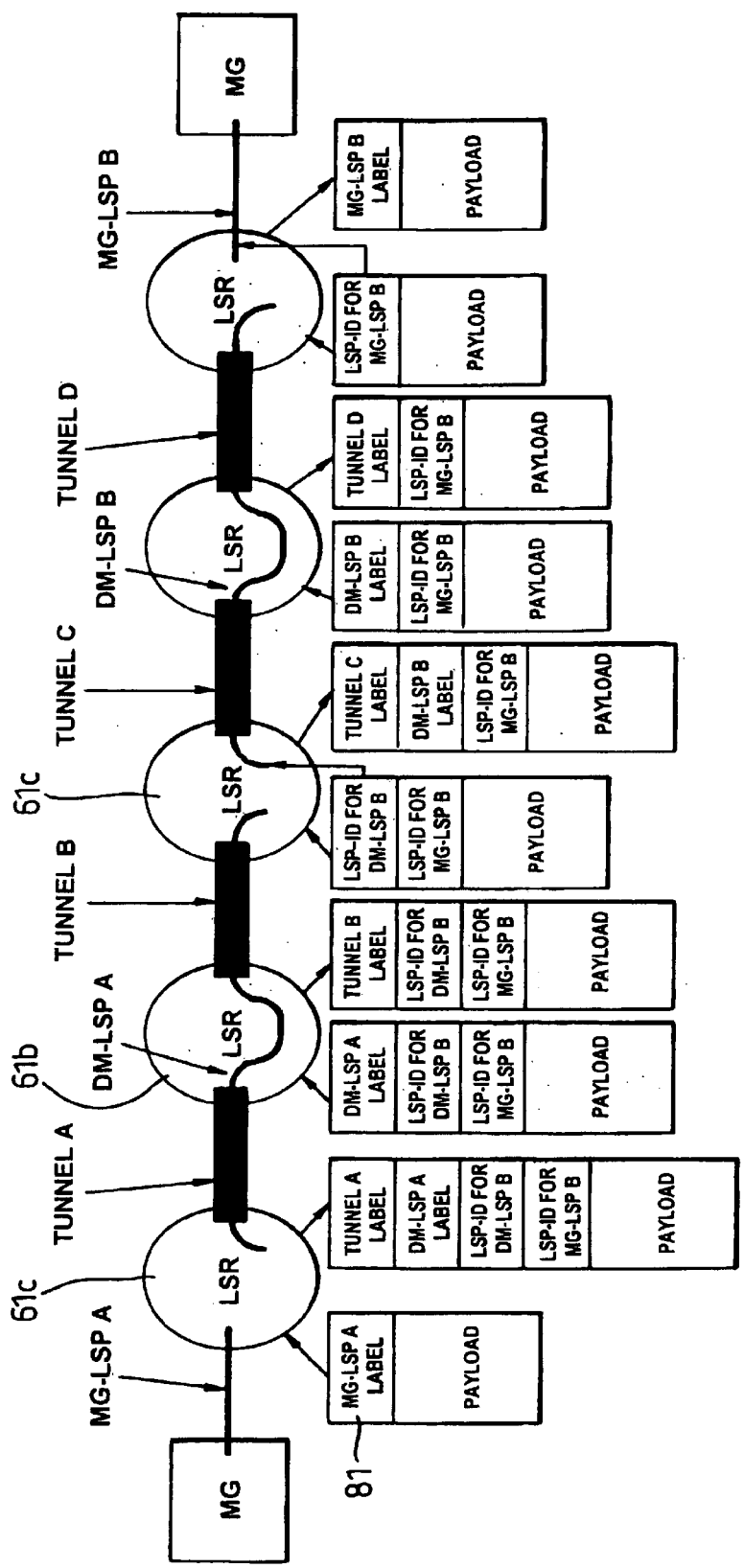
FIG. 9 illustrates the Four-label processing functions at each node of FIG. 6.

The label processing in each of the five nodes for the four-label embodiment is illustrated in FIG. 9. The Local LSR receives a packet with the label assigned to the MG-LSP A at configuration time. The payload is retrieved and four labels are pushed: Tunnel A Label/DM-LSP A Label/LSP-ID of DM-LSP B/LSP-ID of MG-LSP B. Assuming penultimate hop popping then the packet received by the Local Tandem Node is headed by the DM-LSP A Label, as this is the penultimate node for the DM-LSP A its label is popped. The payload and remaining labels are then sent out on Tunnel B with Tunnel B Label. Again with penultimate hop popping the packet received by the National Tandem is headed by the LSP-ID of DM-LSP B this label is consumed to identify DM-LSP B and the label pair Tunnel C Labe/DM-LSP B Label are pushed. At the distant Local Tandem the DM-LSP B Label is recognised as a penultimate hop for DM-LSP B and is popped. The payload and remaining labels are sent out on Tunnel D with Tunnel D Label. At the destination Local LSR the packet is headed by the LSP-ID of MG-LSP B, this is consumed in identifying MG-LSP B and the packet is delivered to the MG with MG-LSP B Label which was established when MG-LSP B was configured.

Figure 10:
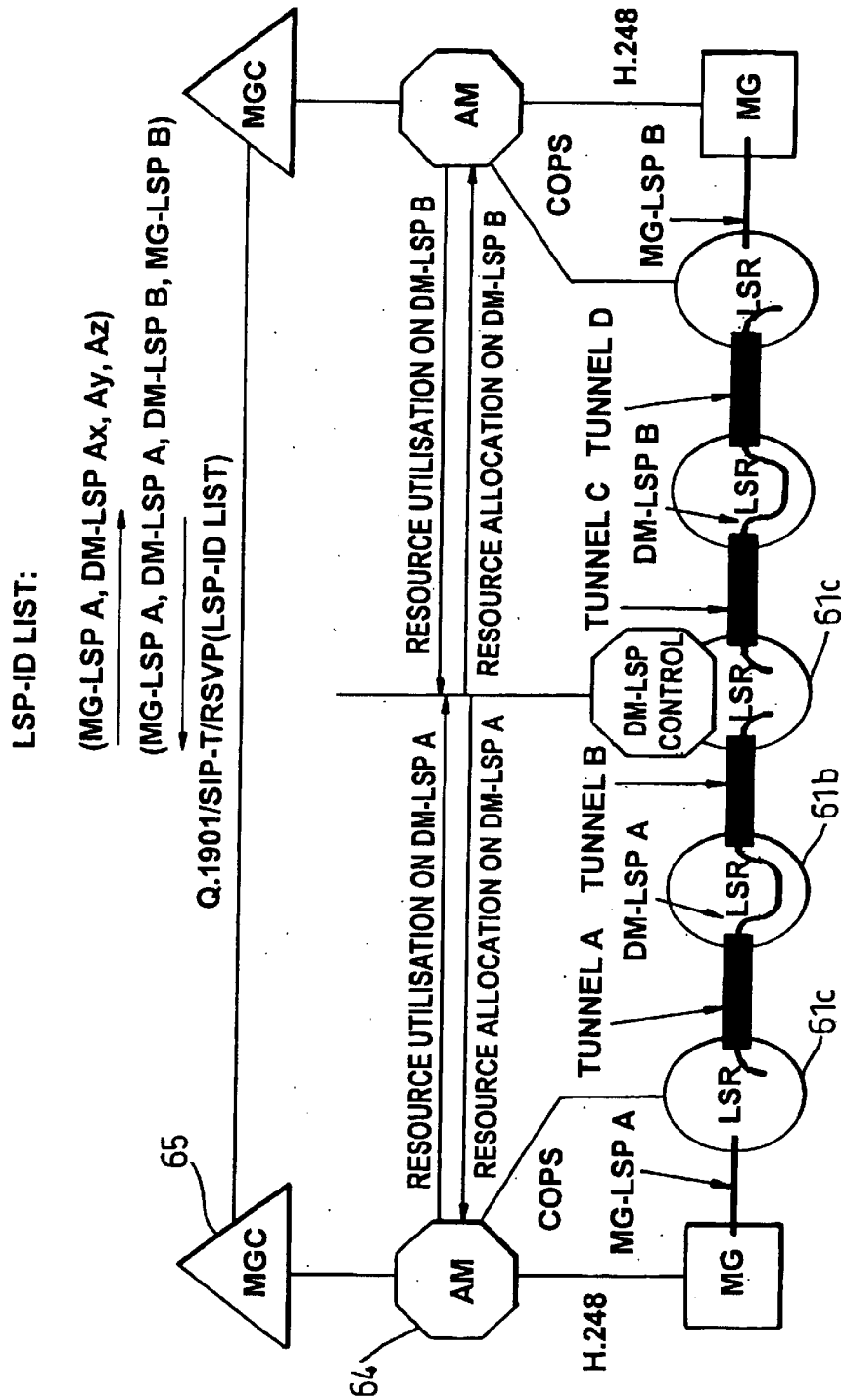
FIG. 10 illustrates the control functions of FIG. 6 to guarantee connection oriented behaviours of the end-to-end path.

The overall control environment for five-stage MPLS networks is illustrated in FIG. 10. Each Admission Manager associated with an MGC maintains a regular dialogue with the DM-LSP control functions in the National and International Tandems. On a routine basis it informs the DM-LSP Control of its current utilisation of resources on a particular DM-LSP, this allows the DM-LSP Control to evaluate the resource utilisation on the hidden tunnel (i.e. egress from Local LSR to National Tandem or Ingress from National Tandem to Local) for this DM-LSP and to offer an explicit allocation of resources to the AM for the next control interval. Assuming session holding times equivalent to current PSTN of about 120 seconds then control intervals of 10 or 20 seconds would be appropriate. When a session request arises then the AM on the originating side is able to select an MG-LSP A and to nominate candidate DM-LSPs Ax, Ay, AZ which have sufficient allocated resource for the session. The terminating side AM is now able to define the LSP-ID tuple for the connection by inspecting candidate DM-LSPs Bx, By, Bz. After selection it offers MG-LSP A/DM-LSP A/DM-LSP B/MG-LSP B, this is then used by the AM to push the end-to-end connection. If the DM-LSP Control function is cautious in allocating resources to AMs then the whole process is deterministic and the Layer 1 Tunnels are never overloaded and thus, with wirespeed operation of all LSRs and CBR contracts for the Layer 1 Tunnels, end-to-end MPLS services behave as an exact equivalent to end-to-end ATM CBR traffic. This assumes that all physical ports between nodes are at OC12/STM4 or higher speeds and that the normal packet size of IP of 1500 bytes is not exceeded.

Figure 12:
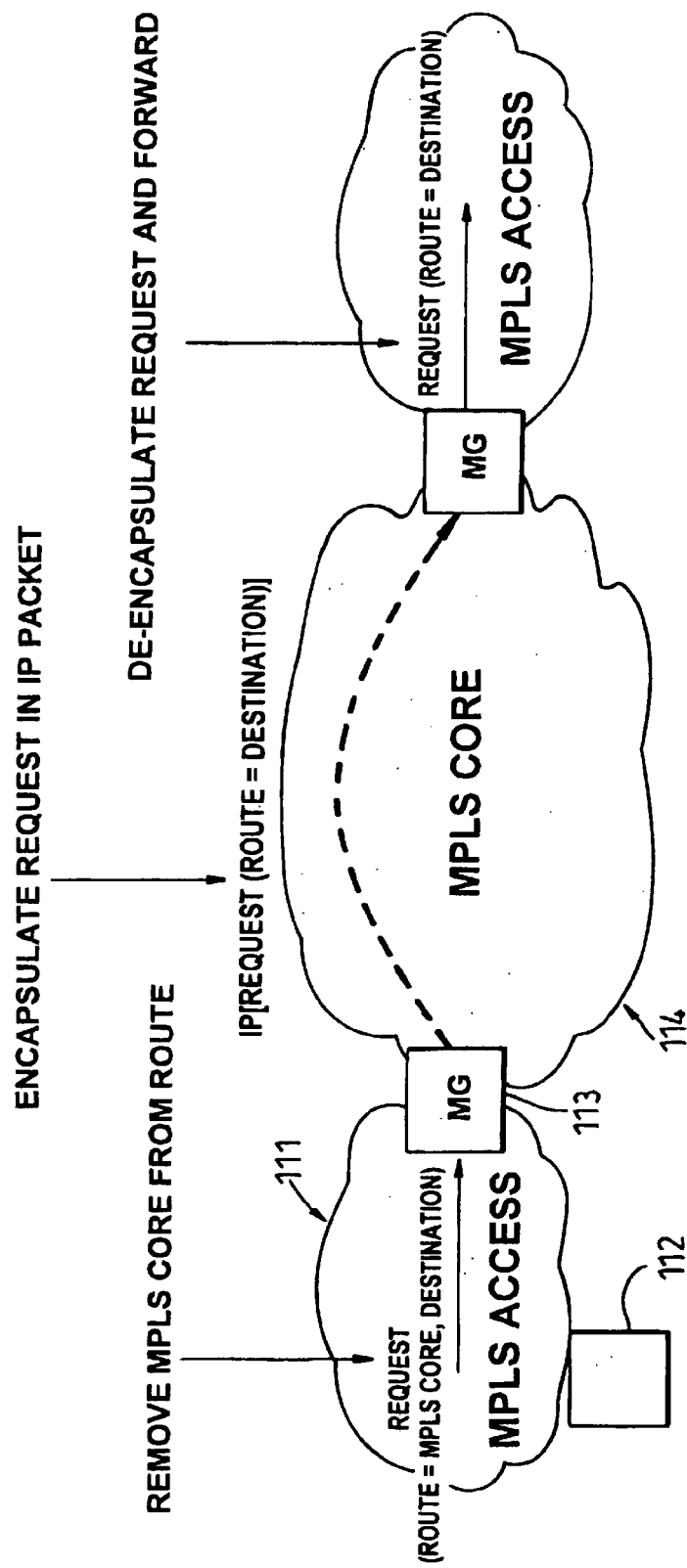
FIG. 12 illustrates a method of transparently forwarding edge control information across an MPLS core network.

In a preferred embodiment illustrated schematically in FIG. 12, instead of the call control layer feeding down the requirements for an end-to-end using session set-up signalling as a trigger, stimulus is taken from the network layer. In this approach the access network 111 supports MPLS and uses CR-LDP or RSVP-TE to perform label allocation. It is therefore the label requests used by these protocols that stimulate the label stack negotiation. This permits the establishment of QoS-capable connections from the user's application terminal 112 to the media gateway 113 providing access to the MPLS core network 114. When these signalling mechanisms are used, they permit the specification of an explicit route for a connection that can consist not only of LSP-IDs and explicit addresses as discussed above but also the use of abstract nodes. This permits a route to be incompletely specified when it is requested in terms of the nodes that it will pass through (except for its destination), leaving the determination of the exact route to the label distribution protocol and associated routing protocols. As IP addresses are commonly grouped together for a particular core network, this permits the abstract node description to be used to specify merely the core network across which the session is to be routed. As MPLS paths can also be defined in terms of a forwarding equivalence class (FEC) that can also be a prefix masked IP address. Through control of the labels allocated in the access network it is possible to control which media gateway on the core network a particular access network will be routed to.

It will be appreciated that, in the arrangement of FIG. 12, an access network may provide user access to a plurality of core networks.

In a further enhancement, CR-LDP supports the use of autonomous system numbers to describe the route to be taken. An autonomous system number allows a group of prefix addresses to be labelled by a single number and is a common feature in large BGP-based networks. In this enhancement, a single AS number is used to identify all possible prefixes. This universal AS number can thus be used in MPLS path setup to indicate a user's willingness to accept any path to its destination that meets its declared QoS requirements.

Figure 11:
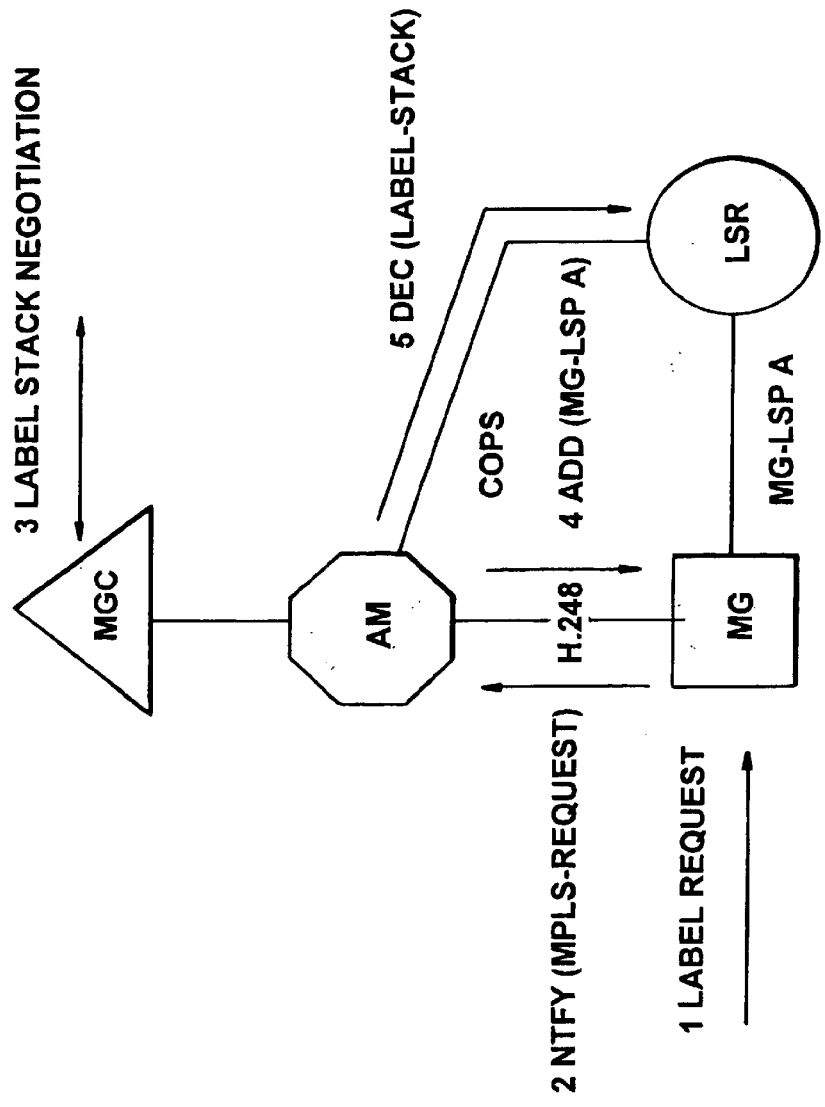
FIG. 11 illustrates an edge control mechanism at a MG that uses MPLS signalling as a trigger.

Referring now to FIG. 11, when a label request is received at the ingress media gateway to the MPLS core, its route description will contain two elements, regardless of the route taken to reach the media gateway, namely the AN description of the MPLS core and the IP address of the destination. This event is detected by the media gateway and causes an H.248 Notify message to be generated indicating that a path has been requested across the core MPLS network. This requires the Notify message to contain the description of the session using the traffic description from the request message. This can be accomplished for example by using the methods described in the SDP extensions for ATM document currently submitted into the IETF, as H.248 supports SDP session descriptions. A new event type MPLS-request would be defined to indicate that this is the event being notified. This would be performed according to the package definition rules in the IETF H.248 document the contents of which are incorporated herein by reference. In this embodiment, the admission manager informs the media gateway controller (MGC) that a new path is needed and the destination for the whole session. The media gateway controller then performs the LSPID exchange with the destination media gateway controller, as previously described, to determine the path across the MPLS core, and uses the COPS push mechanism to install the four-label stack. H.248 then installs connections on a media gateway by creating objects called Terminations and associating them together into the same Context using an Add command. As the label request traverses the network, both media gateways will each have a new Termination created on their respective access sides of the network. An Add will then associate this with the pre-computed label Termination used between the media gateway and LSR. The computed label stack will still be passed to the LSR using the COPS Push method described in a co-pending patent. This procedure is illustrated schematically in FIG. 11.

In the exemplary embodiment of FIG. 11 the Label request is passed to the far edge of the core MPLS network. The request will have specified the MPLS core as the next hop in the explicit route. This next hop element is removed from the route description before being passed onwards. With this removal effected, it should be rendered transparent to the underlying network using IP in IP encapsulation of the CR-LDP or RSVP-TE packet. This is particularly advantageous in avoiding interaction with the MPLS core network and the likelihood of establishing uncontrolled or unwanted additional LSPs. When the request has reached the far edge of the core, it is de-encapsulated and forwarded across the MPLS access network to the destination. The called party issues a response that includes the label mapping on a per-MPLS-hop basis. As this response is sent back across the access network and received at the media gateway, it updates the H.248 Termination on the access side of each media gateway to include the newly allocated MPLS label for the access network.

To avoid similar unwanted interaction with the MPLS core to the label request, this response can be encapsulated using IP in IP encapsulation when sent between the media gateways at the edges of the MPLS core network. This encapsulation technique is illustrated schematically in FIG. 12 referred to above. Having reached the originating side of the core network, the label response is finally forwarded back across the access to install the labels back to the calling party.

Figure 13:
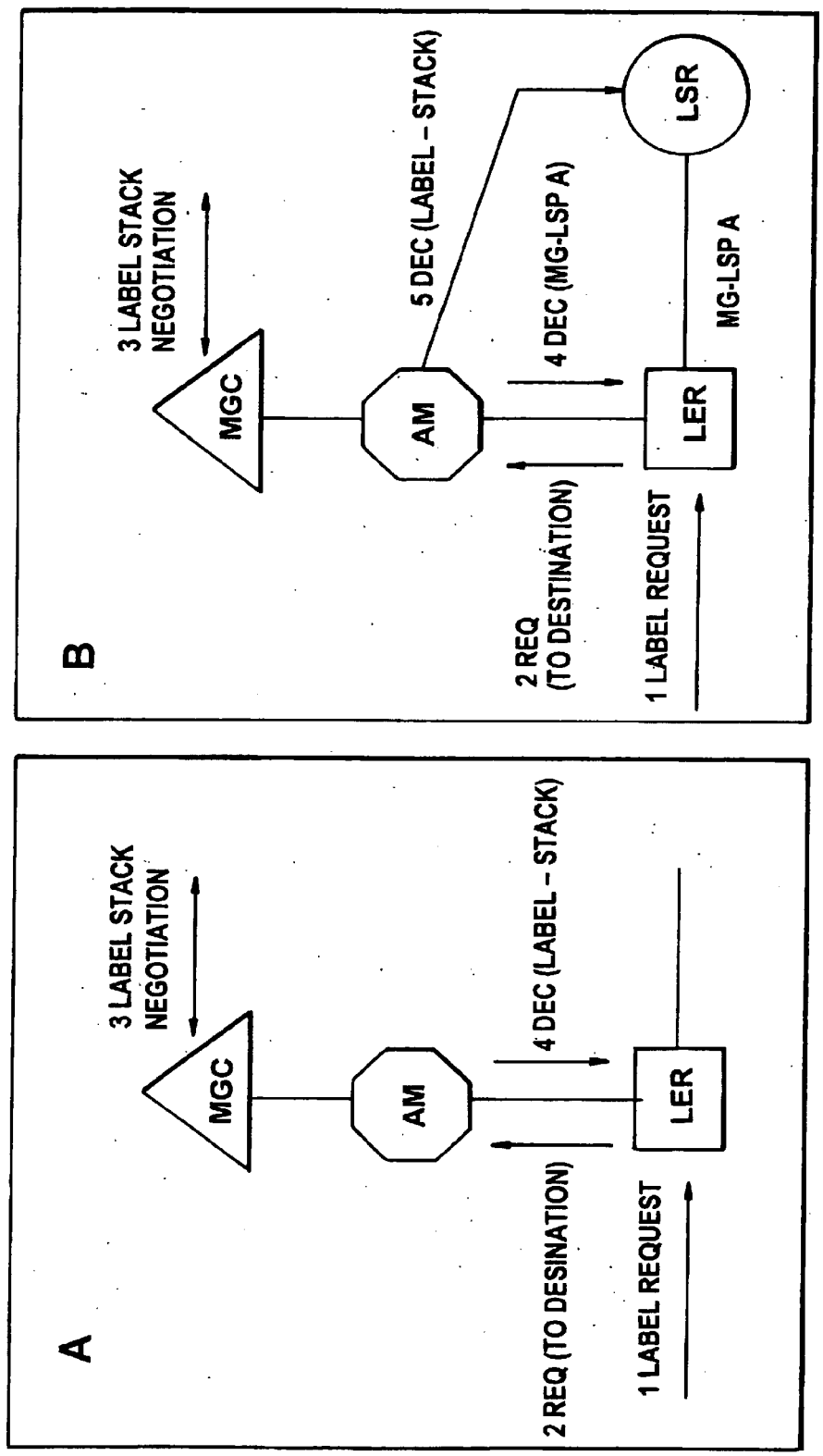
FIGS. 13A and B illustrate two methods of edge control at a Label Edge Router using MPLS signalling as a trigger.

In a further embodiment depicted in FIGS. 13a and 13b, the media gateway can be either removed from, or replaced in the architecture, and the label request will then terminate directly on an edge LSR, referred to hereafter as a Label Edge Router (LER). The receipt of the request will trigger the standard COPS pull process, that is a COPS REQ will be sent to the admission manager asking for a forward path. As described above, this will trigger the route negotiation process to generate the LSP-IDs for the session. Note that in this embodiment, only a 3-label stack is needed as the LSP-ID for MG-LSP B is not required. If the media gateway is removed from the architecture, these LSP-IDs are then sent back to the edge LSR in a COPS DEC message that uses the same ClientHandle as the original REQ. This is in contrast with the Push case where the ClientHandle is associated to the first hop LSP. In this preferred embodiment the ClientHandle is now session specific and permits alteration of the SLA assigned to the session to be performed quickly using the ClientHandle to identify the session. This can be seen in FIG. 13A. Following the receipt of the DEC the labels are installed for the selected LSP and a RPT is returned to the AM to indicate the success (or failure) of this operation. If the media gateway is merely replaced in the architecture, a COPS DEC is sent back to the LER that contains the first hop LSP and a DEC is pushed to the first LSR in the core containing the four-label stack as before as shown in FIG. 13B.

The request message has an identical potential interaction as in the previous embodiment of FIG. 12; namely that the request might interact adversely with the controlled LSPs already installed on the core network. Again, the element that specifies the MPLS core as the next hop is removed from the request message. The request is then again passed transparently with respect to the MPLS layer across the core. This again can use IP in IP encapsulation between the two edge LSRS. When the response is sent back by the called party, when the request reaches the edge LSR on the destination access node, it also receives this encapsulation. When it reaches the edge LER on the originating side of the MPLS core, it is de-encapsulated and forwarded back towards the calling party, with the correct assigned label in the access network.

Figure 14:
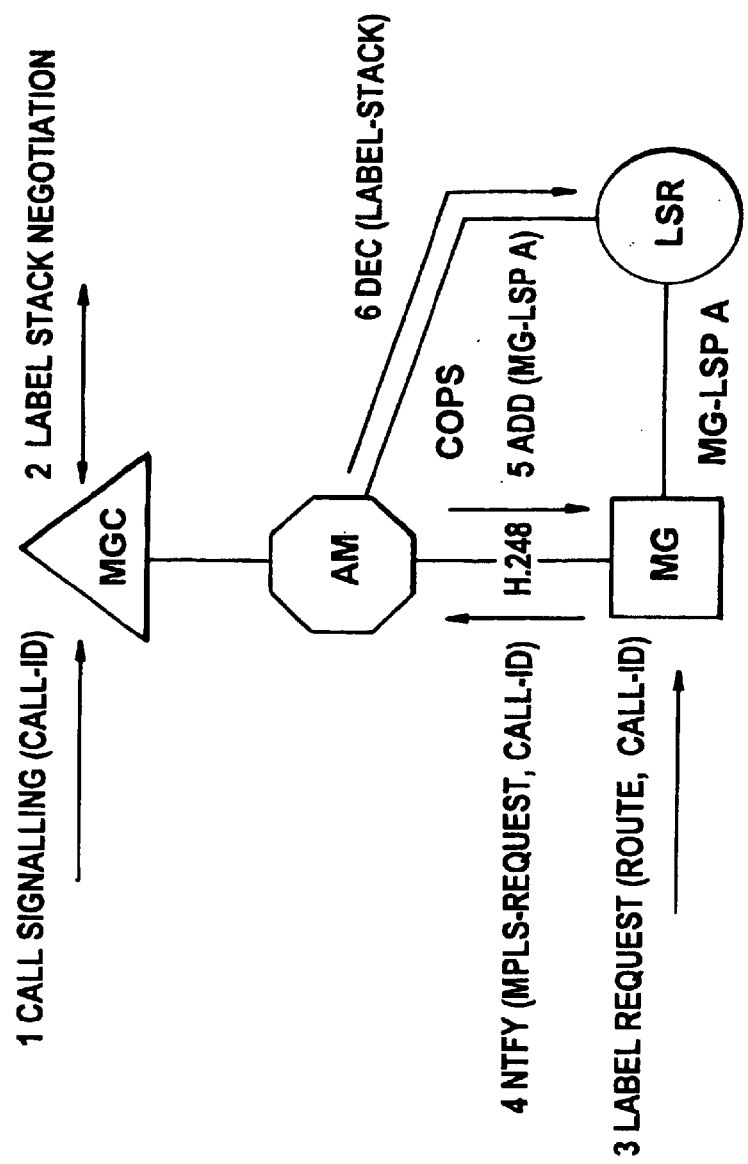
FIG. 14 illustrates a method of synchronising session and MPLS signalling to perform label allocation.

In a further embodiment illustrated in FIG. 14, the session signalling and the MPLS requests can be associated to reduce the time taken to establish the reservation. The end-to-end session signalling can be used to establish the labels across the MPLS core.

Figure 15:
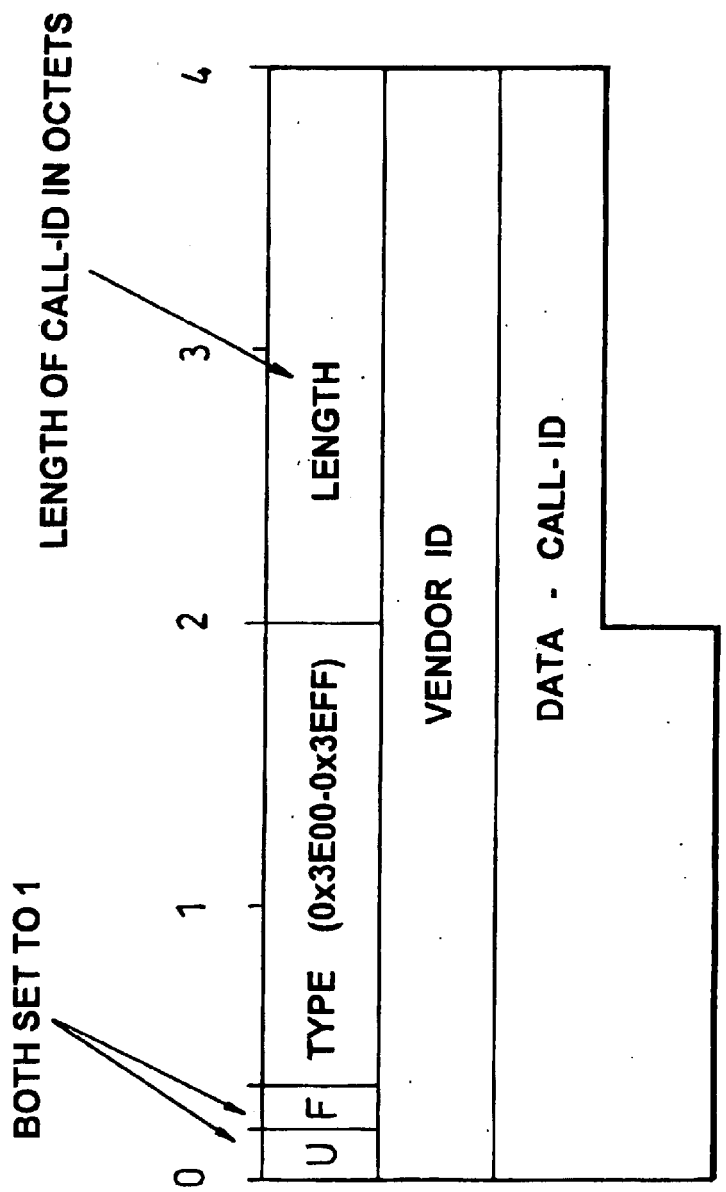
FIG. 15 illustrates an MPLS Type-Length-Value construct that can transport session signalling information.

Each method of signalling uses a unique identifier for this interaction; for example SIP uses a Call-ID which is unique and generated by the calling party. If this Call-ID is passed to the MPLS layer and included in its request message, then a COPS REQ triggered by the arrival of a label request need only pass this Call-ID to MGC to identify the label stack that should be installed. As the SIP Interaction will use the unique identifier throughout the label negotiation, this provides an indexing parameter to be used in the COPS process. By correlating the Call-ID in the REQ with those stored at the super-ordinate manager, the precomputed label stack can be passed straight back. This removes the delay experienced in the previous embodiments while waiting for the label stacks to be determined. This process is described in FIG. 14. The encoding of the Call-ID (or other value) for use within MPLS is easily performed in CR-LDP using a vendor specific TLV using one of the unassigned Type values. The range for these values is 0x3E00 to 0x3EFF. To ensure that the TLV reaches the edge of the MPLS network, the following bits are set. The U bit should be set to 1, which ensures that the request message is not rejected by network elements that do not understand the new TLV. The F bit is also set to 1 to indicate that the unrecognised TLV should be forwarded with the request message when not understood. The Length of the TLV will be variable, dependent on the length of the Call-ID. The Vendor ID will be one of the four listed by the IEEE. The data field will then be defined as the Call-ID itself, encoded into hexadecimal notation. The format for this can be seen in FIG. 15. Those skilled in the art will recognise that other session level identifiers can be accommodated in a similar manner.

It will be understood that the above description of a preferred embodiment is given by way of example only and that various modifications may be made by those skilled in the art without departing from the spirit and scope of the invention.

What is claimed is:

1. A method of routing an information packet over a label switched path from an end station to a destination via an access network and a core network, the method comprising attaching to the packet a label stack identifying a route for a quality of service capable connection from the and station via the access network to the core network and across the core network to the destination, wherein said core network comprises a plurality of abstract nodes interconnected by tunnels and each comprising one or more real nodes, and wherein said route across the core network comprises a plurality of label switched path sections specified in terms of a sequence of abstract nodes.

2. A method as claimed in claim 1 wherein said label switched path sections are incorporated in dynamic multiplexed label switched paths comprising first-stage and second-stage Layer 1 constraint-based routed label switched paths.

3. A method as claimed in claim 2, wherein a new session is multiplexed on to a said dynamic multiplexed label switched path only if the resource constraints of the first-stage and second-stage Layer 1 constraint-based routed label switched paths are satisfied.

4. A method as claimed in claim 3, wherein whereby the resource availability of the second-stage constraint-based routed label switched paths is advertised periodically to the first-stage constraint-based routed label switched paths, the resource availability being used in DM-LSP path selection.

5. A method as claimed in claim 4, wherein a route description comprises an abstract node description of the core network and an IP address of the destination.

6. A method as claimed in claim 5, wherein the access network provides access to a plurality of core networks, and wherein each said core network is associated with a group of destination IP addresses.

7. A method as claimed in claim 6, wherein the labels defining the sequence of tunnels are assigned during tunnel establishment.

8. A method as claimed in claim 6, wherein the labels defining the sequence of tunnels each identify a tunnel by means of a label switched path identifier.

9. A method of routing an information packet over a label switched path from an end station to a destination via an access network and a core network comprising a plurality of nodes, the method comprising: defining in the core network a mesh of quality of service capable tunnels interconnecting said nodes, and attaching to the packet a label stack identifying a route for a quality of service capable connection from the end station via the access network to the core network and via selected ones of said tunnels in the core network to the destination, wherein said core network nodes comprise abstract nodes each constituted by one or more real nodes.

10. A method as claimed in claim 9, wherein a route description comprises an abstract node description of the core network and an IP address of the destination.

11. A method as claimed in claim 10, wherein the labels defining the sequence of tunnels are assigned during tunnel establishment.

12. A method as claimed in claim 10, wherein the labels defining the sequence of tunnels each identify a tunnel by means of a label switched path identifier.

13. A method as claimed in claim 12, wherein a stack of four labels is used to define a sequence of four tunnels within a five-stage MPLS network.

14. A method as claimed in claim 13, wherein a common signalling is used to construct the access and core connections.

15. A method as claimed in claim 13, wherein a common signalling is used to construct the access and core connections.

16. A method as claimed in claim 15, wherein a stack of four labels is used to define a sequence of four tunnels within a five-stage MPLS network.

17. A method as claimed in claim 16, wherein the labels defining the sequence of tunnels are assigned during tunnel establishment.

18. A method as claimed in claim 16, wherein the labels defining the sequence of tunnels each identify a tunnel by means of a label switched path identifier.

19. A method of routing an information packet over a label switched path between first and second end stations in a virtual private network defined over a network arrangement incorporating an access network and an MPLS core comprising a hierarchical arrangement of first, second and third levels of routers, the method comprising attaching to the information packet a four-label stack at the edge of the network in order to achieve end-to-end connection oriented behaviour with guaranteed Quality of Service, and wherein the label allocation of a said information packet is determined from the MPLS core.

20. A method as claimed in claim 19, wherein said core network nodes comprise abstract nodes each constituted by one or more real nodes.

21. A method as claimed in claim 20, wherein a route description comprises an abstract node description of the core network and an IP address of the destination.

22. A communications multi-service network arrangement for transporting information packets from a user station to a destination, the network arrangement comprising; a label switched core network constituted by a plurality of abstract nodes interconnected by tunnels and each comprising one or more real nodes, and an access network providing user access to the core network, wherein a route across the core network comprises a plurality of label switched path sections specified in terms of a sequence of abstract nodes, said route being identified by a label stack identifying a route for a quality of service capable connection from the end station via the access network to the core network and across the core network to a destination.

23. A communications multi-service network as claimed in claim 22, wherein the labels defining the sequence of tunnels are assigned during tunnel establishment.

24. A communications multi-service network as claimed in 23 where a common signalling is used to construct the access and core connections.

25. A communications multi-service network as claimed in claim 24, wherein the labels defining the sequence of tunnels each identify a tunnel by means of a label switched path identifier.

26. A communications multi-service network as claimed in claim 24 in which a stack of four labels is used to define a sequence of four tunnels within a five-stage MPLS network.

* * * * *